United States Patent [19]

Goldstone

[11] 4,003,054

[45] Jan. 11, 1977

[54] METHOD OF COMPENSATING FOR IMBALANCES IN A QUADRATURE DEMODULATOR

[75] Inventor: Bertram J. Goldstone, Lexington, Mass.

[73] Assignee: Raytheon Company, Lexington, Mass.

[22] Filed: Oct. 3, 1974

[21] Appl. No.: 511,553

[52] U.S. Cl. .......................... 343/17.7; 343/5 DP; 343/7.7; 343/17.2 PC

[51] Int. Cl.$^2$ .......................................... G01S 7/40

[58] Field of Search .......... 343/5 DP, 7.7, 17.2 PC, 343/17.7

[56] References Cited

UNITED STATES PATENTS 3,680,105 7/1972 Goldstone .................. 343/17.2 PC 3,950,750 4/1976 Churchill et al. ............... 343/7.7 X

*Primary Examiner*—T.H. Tubbesing

*Attorney, Agent, or Firm*—Philip J. McFarland; Joseph D. Pannone

[57] ABSTRACT

A method for correcting errors due to imbalances between the two channels of a quadrature demodulator in a radar system is shown. The contemplated method comprises generally the steps of measuring, by performing a Fourier transform on a test signal periodically impressed on the quadrature demodulator, the amplitude and phase imbalances between such channels and then deriving correction coefficients to compensate for such imbalances during operation.

1 Claim, 4 Drawing Figures

METHOD OF COMPENSATING FOR IMBALANCES IN A QUADRATURE DEMODULATOR

BACKGROUND OF THE INVENTION

This invention pertains generally to radar systems and particularly to such radar systems as those which incorporate quadrature demodulators.

It is known in the art that a limiting factor in the operation of conventional pulse Doppler or pulse compression radar systems is the accuracy with which intermediate frequency signals may be translated, or down-converted, to provide the requisite demodulated received signals for final processing. The accuracy of such translation, or demodulation, is of particular import when the final processing is to be carried out by using digital computation techniques. In such a case, because the demodulated received signals may most effectively be derived by any well known quadrature demodulation process, it is highly important that neither the demodulation process nor the conversion of the demodulated analog signals to complex digital numbers introduce errors in the demodulated signals. Unfortunately, however, imbalances existing in the circuitry of any practical quadrature demodulator result in significant errors in the demodulated signals. In particular, such imbalances cause unwanted frequency components to be generated in the frequency spectra of the demodulated frequency signals.

If, as in the case in any practical quadrature demodulator, imbalances between channels cannot be avoided then, obviously, the next best thing is to compensate in some way for the resulting change caused by such a demodulator in the frequency spectrum of any received signal being processed. Thus, in many cases, known "pilot pulse" calbrating techniques may be employed. According to a typical one of such techniques a test signal of fixed amplitude with a known frequency spectrum, i.e. a pilot pulse, is periodically passed through a receiver and the cumulative effect of all elements in the receiver (including a quadrature demodulator) on the frequency spectrum of the pilot pulse is observed. Adjustment of selected elements then may be effected to compensate for what may be considered an "average change in the frequency spectrum of the pilot pulse in passing through the receiver."

While any such pilot pulse calibrating technique obviously may be applied to a compensation procedure for error induced only in a quadrature demodulator in a receiver, it is equally obvious the resulting calibration will not be completely accurate for each frequency in any signal having a broad frequency spectrum. Because the error induced in any known quadrature demodulator is dependent upon both the amplitude and the frequency of the signals being demonstrated, it follows that any conventional pilot pulse calibration technique is not completely effective when a quadrature demodulator is used in a radar system processing signals which have relatively wide frequency spectra, such as a pulse Doppler or a pulse compression radar system.

In view of the foregoing it is a primary object of this invention to provide an improved method for calibrating a quadrature demodulator in a radar system such as a pulse Doppler or a pulse compression radar system.

SUMMARY OF THE INVENTION

The foregoing primary object of this invention and other objects to be discerned are attained generally by periodically calibrating a conventional quadrature demodulator in a pulse Doppler or a pulse compression radar in an improved manner comprising the steps of: (a) periodically generating, in place of the modulation signals ordinarily applied during operation to the transmitter of the system being calibrated, a set of test signals comprising linear chirp signals, the deviation of each one of such signals being substantially equal to the maximum deviation of any intermediate frequency signals during operation; (b) applying each one of the test signals as a modulation signal on a carrier at the operating intermediate frequency of the system being calibrated to create a like set of modulated test intermediate frequency signals; (c) phase shifting successive ones of the like set of modulated test intermediate frequency signals to impress a simulated Doppler shift on such signals and applying the resulting set of Doppler shifted modulated test intermediate frequency signals to the quadrature detector of the system being calibrated; (d) processing the resulting demodulated signals from the demodulator to determine, within each one of a selected number of contiguous frequency bands within the limiting frequencies of the linear chirp signals, a measured frequency spectrum of the simulated Doppler shift within each one of such frequency bands; (e) calculating, in accordance with the contents of each such frequency spectrum, a correction signal to compensate for any imbalances in the quadrature demodulator and storing each so calculated correction signal; and (f) applying, during operation of the system, each one of the stored correction signals to the signal processor for the demodulated signals received by the system, such stored correction signals being applied to the signal processor in such a manner that each frequency component of the demodulated signals during operation is appropriately compensated for errors due to imbalances in the quadrature demodulator. In an embodiment of the contemplated method particularly useful in a pulse compression radar system, the correction signals are applied by modifying the complex conjugate of each uncompressed chirp pulse transmitted so that when each such modified complex conjugate is used in the convolution process required for pulse compression, the resulting convolution product is compensated for "quadrature demodulator" error.

BRIEF DESCRIPTION OF THE DRAWINGS

For a more complete understanding of this invention, reference is now made to the following description of the accompanying drawings, wherein.

DESCRIPTION OF THE PREFERRED EMBODIMENTS

Figure 1:
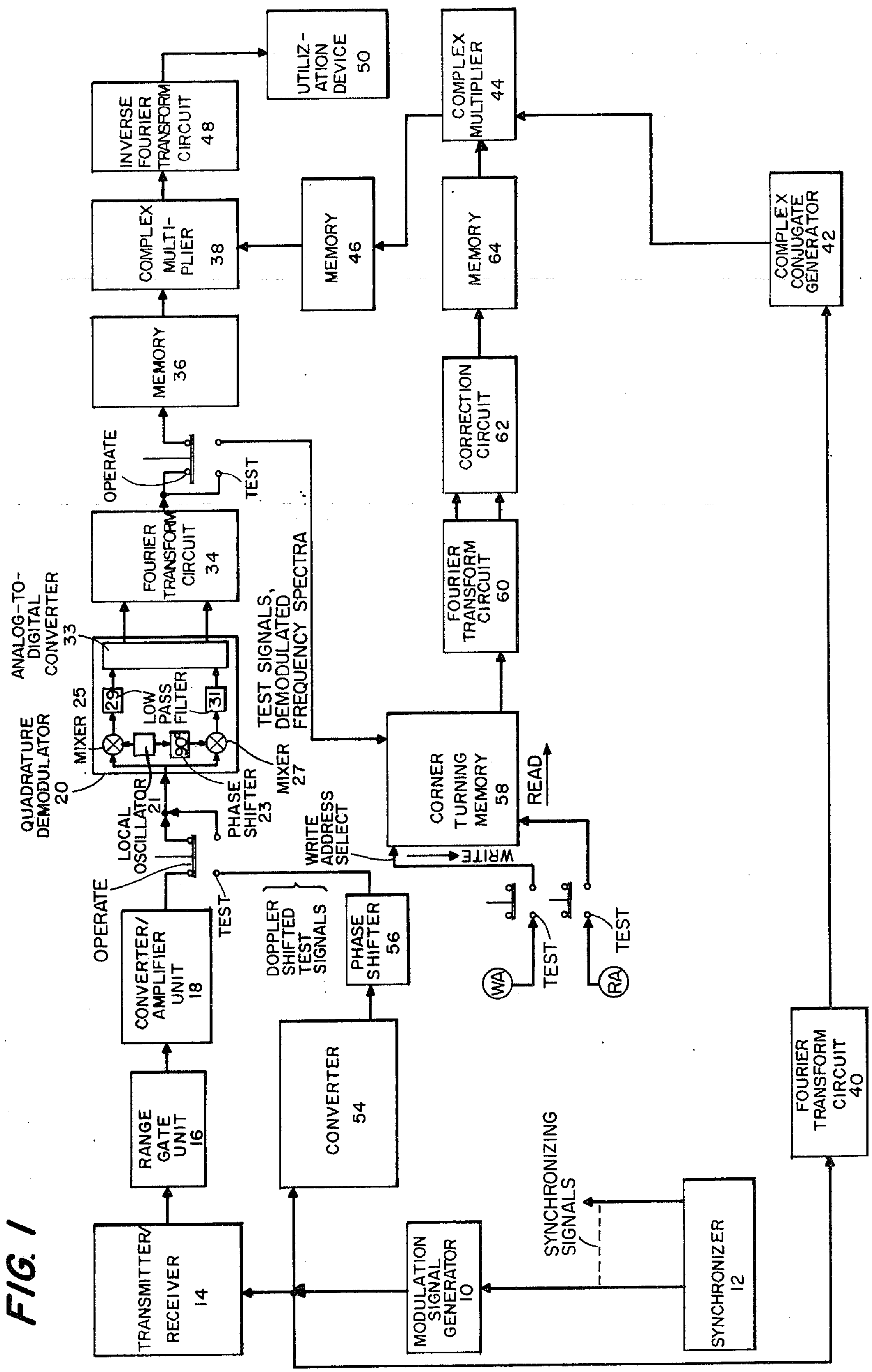
FIG. 1 is a block diagram showing the manner in which signals are generated and processed in a pulse compression radar using the contemplated correction method.

Referring now to FIG. 1, it may be seen that my contemplated method of operating a pulse compression radar system is similar to known methods, except that my method encompasses the idea of compensating for the effects of imbalances inherent in the usual quadrature demodulation process. Thus, according to my method, modulation signals (as, for example, so-called chirp signals) are periodically generated in a modulation signal generator 10 in response to appropriate synchronizing signals from a synchronizer 12 and transmitted from a transmitter/receive 14. Echo signals for any illuminated target within a selected interval of range are selected in a range gate unit 16, downconverted to intermediate frequency echo signals and amplified in a converter/amplifier 18, and again downconverted in a conventional quadrature demodulator 20. As is illustrated, such a demodulator is responsive to intermediate frequency signals and to a pair of local oscillator signals from a local oscillator 21 (one through a phase shifter 23) on mixers 25, 27 to produce a pair of output signals with, nominally, a 90° difference in phase. Ideally, such output signals are identical in amplitude and are exactly 90° different in phase after passing through low pass filters 29, 31. One of such output signals, then, may be referred to as the "in phase" (or real or cosine) signal and the other may be referred to as "the out-of-phase" (or imaginary or sine) signal. Unfortunately, imbalances between the channels in any practical quadrature demodulator are of such magnitude that the output signals deviate significantly from the nominal; if any such signals which so deviate are then sampled and converted to a set of complex digital numbers in an analog-to-digital converter 33, the individual portions of each digital number in such set are in error. My method to be described is based on the assumption that the set of digital numbers produced during the analog to digital conversion process is not absolutely descriptive of the selected intermediate frequency signals, but rather is corrupted by amplitude and phase errors engendered by the process of quadrature demodulation; when such amplitude and phase errors are measured in a manner to be described, correction factors may be derived appropriately to modify the results obtained by processing so that accurate results are obtained. Thus, the set of digital numbers approximating each selected echo signal is processed, here by a conventional Fourier transform circuit 34, to derive the frequency spectrum of each such signal. Because each set of digital numbers into the Fourier transform circuit 34 is not exactly descriptive of a received echo signal, it is evident that the frequency spectrum derived by such circuit is not exactly correct. The actually produced Fourier transform, i.e. the frequency spectrum representative of the received chirp pulse, then is stored in a conventional memory 36. Such stored spectrum is then combined, in a complex multiplier 38 with the complex conjugate, modified in a manner to be described and derived by operation of a Fourier transform circuit 40, a complex conjugate generator 42, a complex multiplier 44 and a memory 46, of the corresponding transmitted chirp pulse and the inverse Fourier transform, derived in an inverse Fourier transform circuit 48, of the resultant product signal is derived and utilized in any desired fashion in a utilization device 50.

It will be noted here that my contemplated modification of the complex conjugate of the modulation signal is intended only to illustrate how compensation for imbalances in the quadrature detection process may be effected. Therefore, no mention will be made of other commonly used modifiers for complex conjugates, such as weighting factors, to reduce time sidelobes or Fresnel ripples in signals out of the inverse Fourier transform circuit. Further, it will be noted that my contemplated modification need be carried out only after relatively long intervals because, obviously, the transfer functions of the two channels in a quadrature demodulator change relatively slowly.

With the foregoing in mind it may be seen from FIG. 1 that when the contemplated correction factors are to be determined, switches (not numbered) may be changed from their illustrated "operate" conditions to their "test" positions. With the switches so changed, successive modulation signals (generated at the pulse repetition frequency of the system) are converted to complex conjugates and stored in the same manner as when operating the system. Simultaneously, each modulation signal is, after being upconverted in an upconverter 54 to a test signal on a carrier having the same frequency as the intermediate frequency of the system, passed through a phase shifter, as a digital phase shifter 56. The latter then modulates, by shifting the phase of the chirp applied to successive test signals through successive increments of phase, the cumulative phase shift being at least $4\pi$ radians. Each frequency component in each successive test signal is, in passing through the phase shifter, subjected to the same increment of phase shift. Such a phase shift for successively generated test signals is the equivalent of a simulated Doppler frequency impressed on the various frequency components in the test signals. Each phase shifted test signal is applied to the same quadrature demodulator 20 as is used during operation and, after conversion to a set of complex digital numbers, is passed through the conventional Fourier transform circuit 34 and stored in a so-called "corner turning" memory 58. Such a memory may take any one of many different known forms, as, for example, a planar array of magnetic cores. Successive addresses in one dimension of such an array are selected to write in successively calculated sets of complex digital numbers out of the Fourier transform circuit and successive addresses along the orthogonal dimension of such array are selected to read out corresponding complex digital numbers in each one of the stored sets.

With the foregoing in mind, it may be seen that the contents of the corner turning memory 58, after the last test signal required to form the last Fourier transform has been processed, may be represented by a matrix of complex digital numbers, say an $n$ by $n$ matrix. It should be noted that the matrix need not be square, but rather may have the dimensions $n$ x $m$, where $m$ is the number, preferably less than $n$, of test signals used during any test cycle to determine the amplitude and phase correction factors for compensation of errors in the quadrature demodulation process. In this connection, if the particular quadrature demodulator being calibrated is designed and constructed following good practice to minimize imbalances between channels, the number of test signals required to achieve a sufficiently precise determination of amplitude and phase imbalances may be far less than the number of points in the Fourier transform. That is, $m$ may be far smaller than $n$. It will be noted here that the manner in which samples of the signals out of the quadrature demodulator 20 are obtained is not essential to this invention. That is, any convenient sampling approach may be taken to obtain the samples required for derivation of the Fourier transform. The Fourier coefficients of successively derived Fourier transforms are entered in successive $F(w)$ is the Fourier coefficient of the time varying waveform at a frequency indicated by $w$, and
$F^*(-w)$ is the complex conjugate of the Fourier coefficient of the time varying waveform at a frequency indicated by $-w$.

Figure 3:
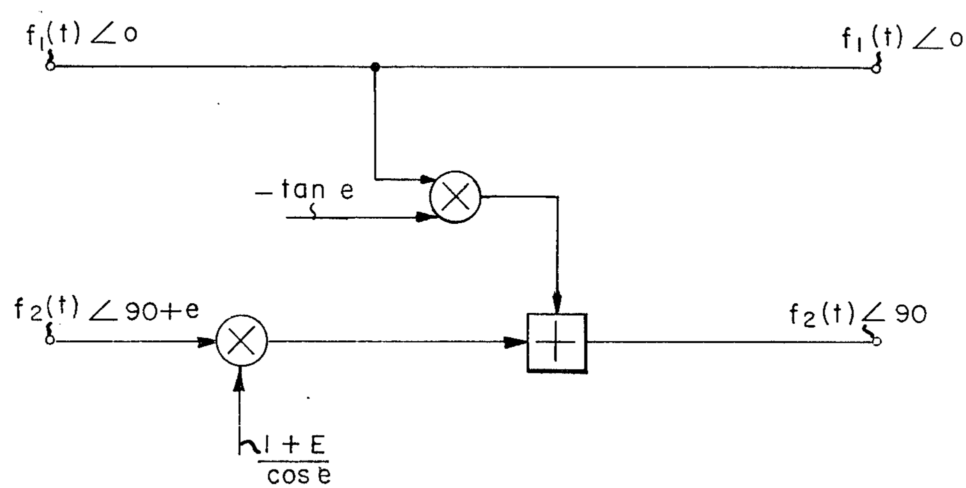
FIG. 3 is a diagram illustrating an algorithm to be used to correct imbalances.

In the instant case, if $F1(w)$ be taken to be the Fourier transform of a first time varying waveform, $f1(t)$, defined by the real parts of the complex digital numbers in any column of the corner turning memory and $F2(w)$ be taken to be the Fourier transform of a second time varying waveform, $f2(t)$, defined by the imaginary parts of the same complex digital numbers, then the components of the Fourier transform of the composite waveform may be manipulated to determine the actual differences between the two time varying waveforms $f1(t)$ and $f2(t)$. With the actual differences between the two waveforms known, then either or both (or the Fourier transforms of either or both) waveforms may be modified in a correction circuit 62 (operative as shown in FIG. 3) so that an ideal Fourier transform of the composite waveform is derived. The modification, or correction, factors then may be stored in a memory 64 and applied to signals being processed during operational cycles of the radar. Obviously, because there are $n$ different columns in the corner turning memory, correction factors for each one of the $n$ different columns may be computed and stored. In other words, a correction factor for each one of $n$ different frequencies within the frequency band of the chirp signal used in the radar may be computed and stored to allow compensation for frequency dependent imbalances in the quadrature demodulation process.

To explicate the foregoing, if $$f1(t) = G \cos wt \quad (3)$$

and $$f2(t) = H \sin (wt + e) \quad (4)$$

where $G$ and $H$ are constants indicating the amplitude of $f1(t)$ and $f2(t)$;

$w$ is the pseudo Doppler frequency; and $e$ is the phase imbalance between channels in the quadrature demodulator, then the following conditions are possible: ($a$) if $G$ equals $H$ and $e$ equals zero, all Fourier coefficients of the Fourier transform of the composite waveform are then zero except the coefficient at the pseudo Doppler frequency; or ($b$) if either $G$ is not equal to $H$ or $e$ is not equal to zero, the Fourier coefficients of the composite waveform are zero except at the pseudo Doppler frequency $w$, and the image frequency of $-w$ of the pseudo Doppler frequency. In condition ($a$) the complex conjugate of the Fourier coefficient in Equations (1) and (2) is zero; in condition ($b$) such conjugate has a finite value.

$$\text{Setting } G = H\,(1+E) \quad (5)$$

where $E$ is the amplitude imbalance between channels in the quadrature demodulator, the composite waveform defined by Equations (3) and (4) may be expressed as $$f(t) = f1(t) + jf2(t) = H(1+E) \cos wt + j\,H \sin(wt+e) \quad (6)$$

The Fourier transform of the time varying signal defined by the real part of Equation (6) is described by Equation (1) and the Fourier transform of the time varying signal defined by the imaginary part of Equation (6) is described by Equation (2). Expressing Equations (1) and (2) in terms of complex digital numbers:

$$2F1(w) = a(w) + jb(w) + a(-w) - jb(-w) \quad (7)$$

and $$2f2(w) = ja(w) + b(w) - ja(-w) + b(-w) \quad (8)$$

where $$F(w) = a(w) + jb(w)$$

and $F(-w) = a(-w) + jb(-w)$

After collecting terms, Equations (7) and (8) become, respectively:

$$2F1(w) = a(w) + a(-w) + j(b(w) - b(-w)) \quad (9)$$

and $$2F2(w) = (b(w) + b(-w)) - j(a(w) - a(-w)) \quad (10)$$

Figure 2:
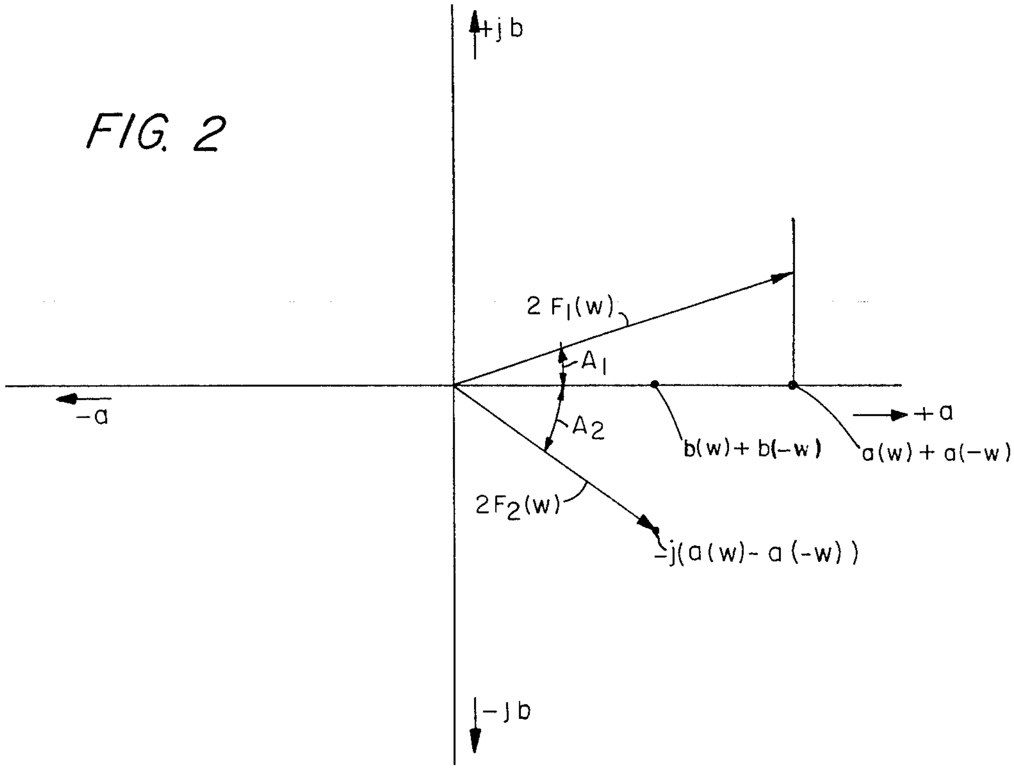
FIG. 2 is a vector diagram illustrating imbalances in both amplitude and phase which cause energy at a pseudo-Doppler image frequency.

The vector diagram of FIG. 2 shows Equations (9) and (10).

It will be noted that the difference in length of the vectors $2F1(w)$ and $2F2(w)$ in FIG. 2 may be considered to be the difference in the energy in the waveforms $f1(t)$ and $f2(t)$. Such difference then is a measure of the amplitude imbalance between $f1(t)$ and $f2(t)$, which imbalance in turn is analogous to an amplitude imbalance in the quadrature demodulation process. It will also be noted that the sum of the angles A1 and A2 is the actual phase difference between $f1(t)$ and $f2(t)$. The difference between the sum of the angles $A_1$ and $A_2$ and 90° is a measure of the phase imbalance in the quadrature demodulation process. Expressing the foregoing mathematically:

$$2F1(w) = 2F2(w)\,(1+E) \quad (11)$$

and $$e = 90 - (A1 + A2) \quad (12)$$

Equations (11) and (12) show an essential feature of the contemplated method which is that the effects of amplitude and phase imbalances suffered by a signal in the quadrature demodulation process may be separated and measured.

Figure 2A:
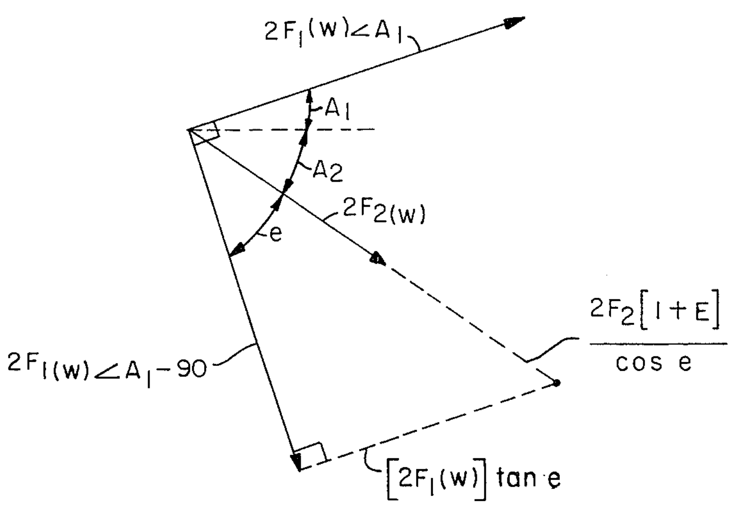
FIG. 2A is a vector diagram showing how imbalances may be corrected.

Once having measured the phase and amplitude imbalances, correction factors to modify signals in either or both channels out of a quadrature demodulator may be derived. Thus, if it be assumed that all errors are in the sine channel, the quantities $F1(w)$ and $F2(w)$ may be represented as indicated in the vector diagram of FIG. 2 and the correction factors (meaning the changes in $F2(w)$ required to eliminate $F(-w)$ from the Fourier transform) may be calculated as shown in FIG. 2A. Briefly, such correction factors are those required to change the amplitude and phase of $F2(w)$ to make $F2(w)$ appear to be in quadrature with $F1(w)$ and equal in amplitude at each one of $n$ frequencies within the band of the chirp pulse used in operation of the radar. Such corrections then could be determined as shown by the algorithm of FIG. 3 and applied to the output of the sine channel during operation.

It will be observed that if the output of the sine channel is corrected during operation, the correction prorows in the corner turning memory 58. Each entry in any row then describes (with a still unknown error) the amplitude and phase angle (relative to any convenient reference) of each one of *n* frequency components in the frequency spectrum of the test signal. Each entry in any column then similarly describes the amplitude and phase angle (again relative to any convenient angle) of the frequency spectrum of the simulated Doppler modulation signal at a particular one of the *n* different frequencies in the frequency spectrum of the test signal. Because of imbalances between the channels in the quadrature demodulator 20, the Fourier coefficients in each row do not exactly assume the characteristic distribution of each linear chirp pulse and the Fourier coefficients in each column do not exactly describe the simulated Doppler modulation signal impressed on the test signals. Specifically, the Fourier coefficients in each column describe, at each one of the *n* frequencies within the frequency spectrum of the test signals, the simulated Doppler modulation signal actually impressed on the test signals, modified by what may be termed "baseline clutter" or "coherent noise" in the paper by J. R. Klauder et al., entitled "The Theory and Design of Chirp Radars," published in the Bell System Journal, Vol. XXXIX, Number 4, July, 1960. Paired echo theory predicts that such unwanted signals appear at the output of a Fourier transform circuit as small signals at the image frequency of the desired signal. Thus, after the Fourier coefficients in any column are read out successively (preferably at the same rate as the samples were taken to derive the entries in each row of the corner turning memory) and a second Fourier transform (here also an *n* point transform and referred to hereinafter as the test or simulated Doppler shift transform) is derived in a Fourier transform circuit 60, the then resulting Fourier transform deviates (by reason of imbalances in the quadrature demodulator) from that of the simulated Doppler shift applied to the test signals. That is, instead of the frequency spectrum so derived being the Fourier transform, i.e. a single line, of only the simulated Doppler modulation signal impressed on the test signals, such spectrum has two significant lines (neglecting incoherent noise effects) at different frequencies. One such line corresponds to the single line of the ideal simulated Doppler modulation signal impressed on the test signal, while the other such line corresponds to an image Doppler signal caused by coherent noise. To put it another way, the imbalances in the quadrature demodulator 20 cause the energy in the simulated Doppler shift modulation signals to be divided into two components at different frequencies. It follows, then, that to calculate the effect of imbalances in the quadrature demodulator 20, the complex digital numbers designating both significant lines in the test transform must be processed.

Before proceeding further it should be again noted that, as stored in each successive row of the corner turning memory 58, each set of *n* complex digital numbers represents the result of performing an *n* point Fourier transform on a test signal whose frequency varies linearly with time over a given frequency band and whose amplitude is substantially constant. Ideally, meaning in the absence of imbalances in the quadrature demodulation process and a "perfect" test signal, the result of performing an *n* point Fourier transform on such a waveform would be a set of *n* identical complex digital numbers. Such a set of *n* complex digital numbers then reflects the fact that the energy in each test signal is equally distributed over a given frequency band. When any imbalance is encountered in the quadrature demodulation process, the individual complex digital numbers in any set of *n* identical numbers change to reflect such imbalance. The variation between individual complex numbers in any set of *n* numbers cannot be used to determine the imbalance actually suffered during the quadrature demodulation process. Taking each column in the corner turning memory 58, however, as a different set of *m* complex digital numbers it will be observed that each such set describes, for a different one of *n* different frequencies across the frequency band of the test signals, the manner in which the Fourier coefficient varies between *m* successive test signals. If it be assumed that there are no imbalances in the quadrature demodulation process, it is evident that such Fourier coefficients change only because of the phase shift imparted to successive test signals. That is, (with a perfect demodulation process) the Fourier coefficients in each column, when read out at a rate equal to the repetition rate of the test signals, would produce a time varying set of *m* complex digital numbers describing the Doppler shift impressed on *m* successive test signals. Therefore, if the set of complex digital numbers in any column is subjected to an *m* point Fourier transform in a Fourier transform circuit 60, all of the energy in the determined frequency spectrum will be at a single frequency, sometimes referred to here as the "pseudo-Doppler" frequency. On the other hand if some imbalance is suffered during the quadrature demodulation process, the Fourier coefficients in each column of the corner turning memory 58 will change to reflect such imbalance. That is, if the set of complex numbers in any column is subjected to an *m* point Fourier transform, the energy in the determined frequency spectrum will be at the pseudo-Doppler frequency and the image of the pseudo-Doppler frequency. In other words, each one of such time varying sets of *m* complex digital numbers corresponds to a time varying set of *m* complex digital numbers which would be produced in an imperfect quadrature demodulation process if the carrier frequency of the test signals was not chirped, but rather was stepped through *n* different frequencies across the frequency spectrum of the test signals. That is, after the real and imaginary parts of the time varying set of *m* complex digital numbers in any column of the corner turning memory 58 are subjected to an *m* point Fourier transform, the energy in the resulting frequency spectrum would be concentrated at the pseudo-Doppler frequency and at the image of such frequency.

If any Fourier transform indicates that there are two, and only two, sinusoidal components (at a single frequency) in the waveform from which the transform was derived, the Fourier transform of each one of such components may be determined. Thus:

$$2F1(w) = F(w) + F^*(-w) \quad (1)$$

and $$2F2(w) = -JF(w) + jF^*(-w) \quad (2)$$

where $F1(w)$ is the Fourier transform of the first one, $f1(t)$, of two components of a time varying waveform;

$F2(w)$ is the Fourier transform of the second one, $f2(t)$, of two components of a time varying waveform;

cess must be applied to each different received signal to eliminate undesirable Doppler image frequencies from any derived frequency spectra. If, however, signals out of the quadrature demodulator are to be subjected to processing steps in addition to a Fourier transform, it may be more convenient to apply correction factors at other points in a radar system. For example, in the case of a pulse compression radar where received signals are to be correlated with the complex conjugate of transmitted pulses, correction factors could more easily be applied to such conjugates.

Having described a preferred embodiment of this invention, it will be clear to one of skill in the art that changes may be made without providing for my inventive concepts. For example, it will be clear that the correction coefficients may be calculated as described in the application entitled "Radar System" Ser. No. 511,552 filed Oct. 3, 1974 (now U.S. Pat. No. 3,950,750, issued Apr. 13, 1976), Inventors Frederick E. Churchill, George W. Ogar and Bernard J. Thompson, and assigned to the same assignee as the present invention. That is, correction coefficients may be applied to both channels of a quadrature demodulator rather than, as shown herein, to a single one of such channels. Also, as disclosed in the just mentioned application, the method contemplated in this application may be used in radar systems other than pulse compression radars. It is felt, therefore, that this invention should not be restricted to its disclosed embodiment, but rather should be limited only by the spirit and scope of the appended claims.

What is claimed is:

1. A method of correcting imbalances in amplification and in phase shift in the two channels of a quadrature demodulator in a radar receiver, such method comprising the steps of:

a. impressing a sinusoidal test signal analogous to a Doppler shifted echo signal from a moving target on the two channels of a quadrature demodulator of a radar receiver to derive a pair of time varying signals, $f_{1(t)}$ and $f_{2(t)}$;

b. converting each one of the time varying signals, $F_{1(t)}$ and $f_{2(t)}$, to a set of complex digital numbers;

c. determining, as a like set of complex digital numbers, the Fourier transform of the vector sum of the sets of complex digital numbers, such transform having two complex terms, $F(\omega)$ and $F(-\omega)$, where $$F(\omega) = a(\omega) + j\, b(\omega)$$

and $$F(-\omega) = a(-\omega) + j\, b\,(-\omega),$$

indicative, respectively, of the energy at the Doppler frequency, $\omega$, of the vector sum of the time varying signals $f_{1(t)}$, $f_{2(t)}$ and the image frequency, $-\omega$;

d. determining the complex conjugate, $f(-\omega)$, of the complex term $F(-\omega)$;

e. adding the complex terms $F(\omega)$ and $F(-\omega)$ to derive a vector $2F1(\omega)$ indicative of the amplitude and phase of the first time varying signal $f_{1(t)}$;

f. subtracting the complex terms $F(\omega)$ and $F(-\omega)$ and multiplying the difference by the square root of minus one to derive a vector $2F2(\omega)$ indicative of the amplitude and phase of the second time varying signal, $f_{2(t)}$;

g. comparing the amplitudes of the vectors $2F1(\omega)$ and $2F2(\omega)$ to derive a first correction factor indicative of the imbalance in amplitude between the time varying signals $f_{1(t)}$ and $f_{2(t)}$;

h. comparing the difference between 90° and the sum of the phase angles of the vectors $2F1(\omega)$ and $2F2(\omega)$ to derive a second correction factor indicative of the imbalance in phase between the time varying signals $f_{1(t)}$ and $f_{2(t)}$; and i. storing the first and second correction factor and applying such stored correction factors to the signals out of the quadrature demodulator during operation of the radar receiver.

* * * * *